(12) United States Patent
Mootsey

(10) Patent No.: US 8,082,880 B2
(45) Date of Patent: Dec. 27, 2011

(54) CAT PAD

(76) Inventor: Kevin Mootsey, Payson, AZ (US)

( * ) Notice: Subject to any disclaimer, the term of this patent is extended or adjusted under 35 U.S.C. 154(b) by 0 days.

(21) Appl. No.: 12/592,646

(22) Filed: Dec. 1, 2009

(65) Prior Publication Data

US 2011/0126769 A1 Jun. 2, 2011

(51) Int. Cl.
*A01K 29/00* (2006.01)
(52) U.S. Cl. ........................... 119/28.5; 5/733
(58) Field of Classification Search ................ 119/28.5, 119/526; 5/733, 419; D30/118
See application file for complete search history.

(56) References Cited

U.S. PATENT DOCUMENTS

| | | | | |
|---|---|---|---|---|
| D209,118 S | * | 10/1967 | Grube | D24/206 |
| D598,231 S | * | 8/2009 | Thompson | D6/602 |
| D615,710 S | * | 5/2010 | Zine | D30/118 |
| 2003/0145387 A1 | * | 8/2003 | Karafa et al. | 5/733 |

* cited by examiner

*Primary Examiner* — T. Nguyen
(74) *Attorney, Agent, or Firm* — Clayton R. Johnson

(57) ABSTRACT

A pad for a pet, for example a cat, to rest on includes a foam block encased in a fabric covering with generally parallel top surface portions that includes a head top surface portion for the front part of the cat to rest on and a rear main body top surface portion at a lower elevation for the remainder of the cat to rest on. The top part of the head portion is trapezoidal in longitudinal cross section with its major base being below it minor base which provide a part of the pad top surface. The main body portion has a generally planar rectangular top surface portion that is generally parallel to the minor base top surface portion.

6 Claims, 2 Drawing Sheets

CAT PAD

BACKGROUND OF THE INVENTION

This invention pertains to a pet pads, especially for cats. When one is working on a computer and there is a cat in the room, frequently the cat will walk across the keyboard and/or lay down to at lease partially cover the keyboard or the books and/or other papers that one is referring to while using the computer; or otherwise provide a distraction to one accomplishing the task at hand. In order to provide a temping ergonomic distraction for the cat, this invention has been made

SUMMARY OF THE INVENTION

The cat pad of this invention includes a block of foam encased in a fabric covering and having a head portion that is of a greater thickness than the main body portion which extends longitudinal rearwardly of the head portion and with the top part of the head portion being generally trapezoidal in shape with its minor base above its major base. The main body portion is of a greater length than the head portion.

DESCRIPTION OF THE INVENTION

Figure 1:
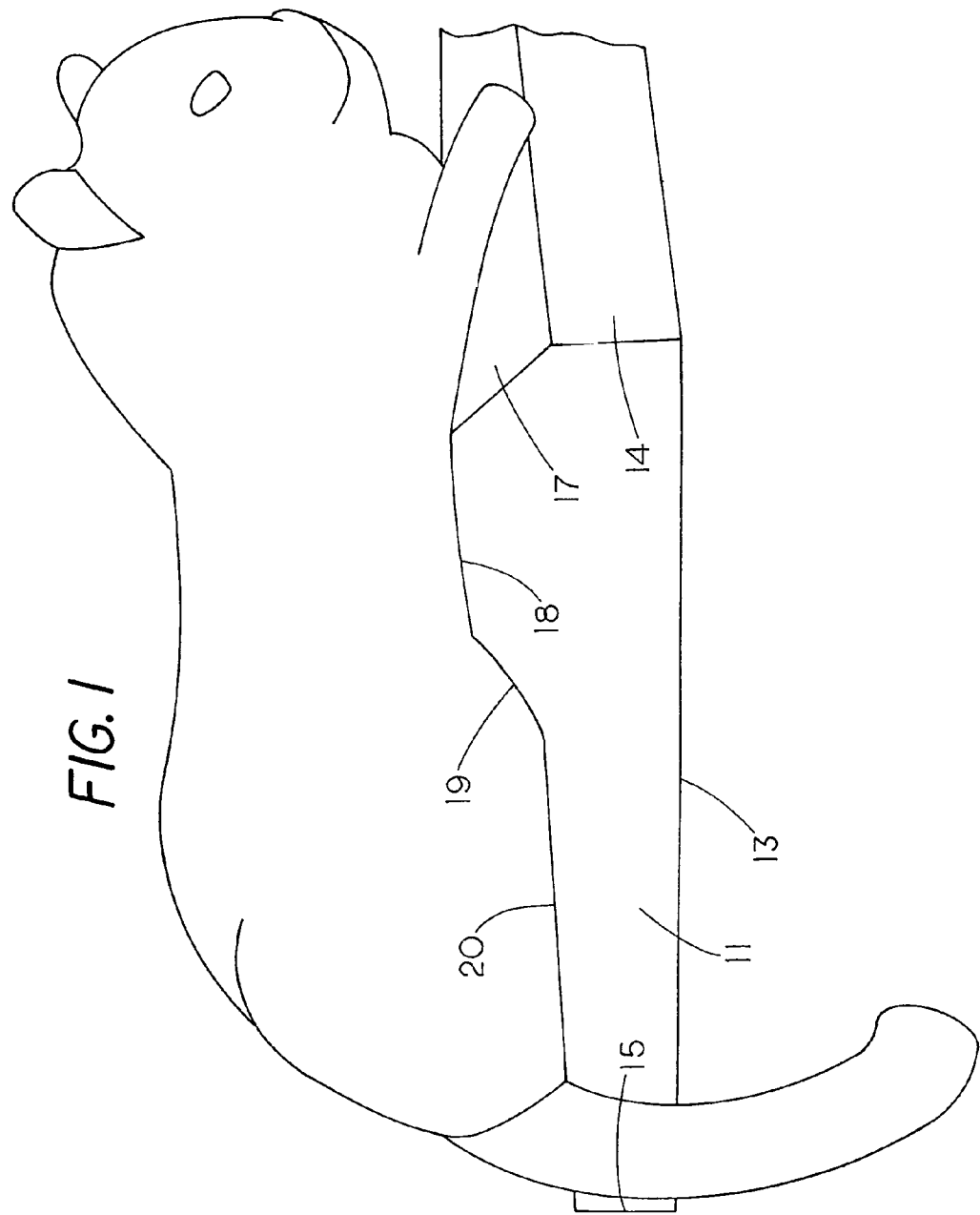
FIG. 1 is a perspective view of the pad of this invention with a cat thereon.
Figure 2:
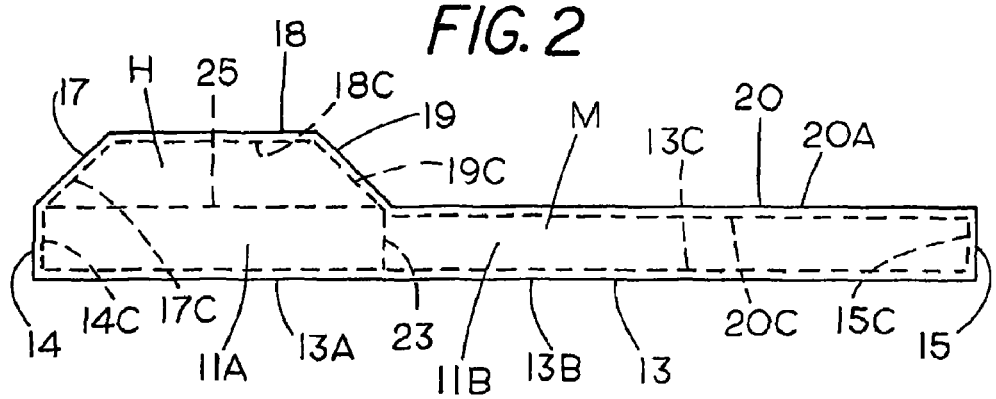
FIG. 2 is a side view of the pad of FIG. 1 with the dotted lines 23, 25 being provided to facilitate describing two portions of the pad while the other dotted lines represent the foam block and are more greatly spaced from the external surfaces of the pad than they are in actuality to facilitate the showing of the invention.
Figure 3:
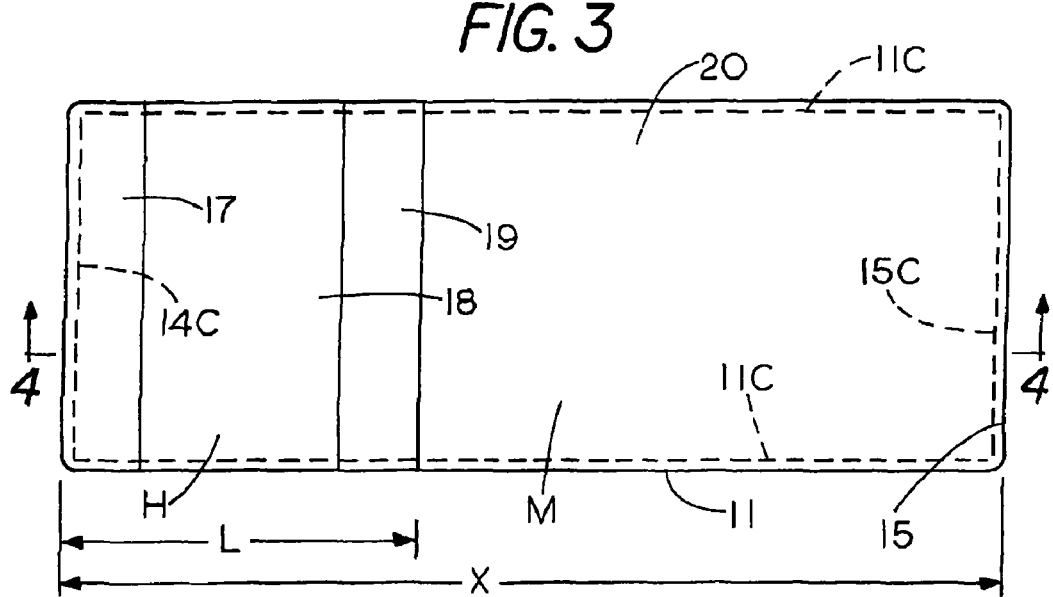
FIG. 3 is a plan view of FIG. 2 with a part of the fabric cover broken away, dotted lines representing those of the foam block being more greatly spaced from the external surfaces of the pad than they are in actuality to facilitate the illustration of the invention.
Figure 4:
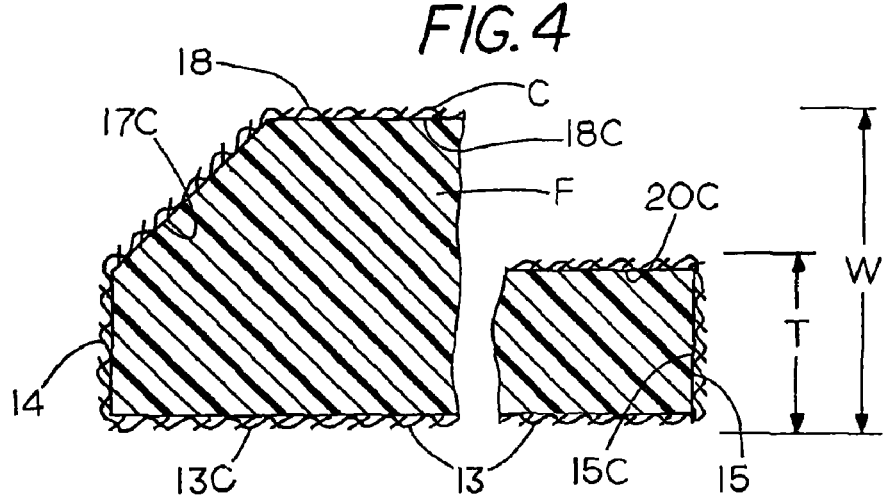
FIG. 4 is a cross sectional view that is generally taken along the line and in the direction of the arrows 4-4 of FIG. 2 with the longitudinal intermediate portion broken away.

A foam block F with a fabric cover C encasing the foam block provide a longitudinally elongated pad that has generally parallel side surfaces 11, a rectangular vertical rear surface 12 extending between and perpendicular to the side surfaces, a generally planar, rectangular bottom surface 13, a rectangular front vertical surface 14 generally parallel to the rear surface 15 and a top surface extending between and intersecting the top edge parts of the front, rear and side surfaces. The top surface has coplanar rectangular top surface portions 17, 18, 19 and 20 that extends between and intersect with the side surfaces, the upwardly and rearwardly inclined surface portion 17 intersecting the front surface, surface portion 20 intersecting the rear surface and side surfaces, and the surface portion 19 is inclined downwardly and rearwardly to the surface portion 20. The pad front and rear surfaces are of substantially the same height (thickness).

The shape of the foam block is substantially the same as that of the pad other than for being slightly smaller than that of pad by the thickness of the cover material. Accordingly, the foam block has generally parallel side surfaces 11C, front surface 14C, a rear surface 15C and top surface portions 17C, 18C, 19C and 24C with surface portions 17C and 19C being inclined at the same angles as surface portions 17, 19 and surface 18C being parallel to surface 20C. Thus the shape of the foam block is substantially the same as the pad other than being smaller due to the thickness of the fabric C.

The pad has a head portion H and a main body portion M that in combination are defined by the above pad surfaces with the foam advantageously being a single integral piece. The head portion as referred to herein is defined by front surface 14, bottom surface portion 13A, top surface portions 17, 18 and 19, side surface portion 11A with the part thereof above dotted line 25 being trapezoidal in shape and having itts minor base above the major base and generally parallel thereto and a rectangular portion intersecting the above major base to extend therebelow. The head rear transverse surface is represented by dotted line 23 wherein the head portion is integrally joined to the front end of the main body portion M the foam block may be formed as a single solitary unit.

The pad main body portion as described herein is defined by dotted line 23, top surface portions 20A, rear surface 15, side surface portions 11B and bottom surface portion 13B. Advantageously the pad surface portion 17 extends upwardly and rearwardly from surface 14 to surface portion 18 at an angle of about 45 degrees, the pad surface portion 18 is substantially parallel to surface portion 20 and surface portion 19 extends downwardly and rearwardly from surface portion 18 to surface portion 20 with the angle of intersection being about 135 degrees. Thus the inclined surfaces 17, 19 converge in an upward direction. Advantageously the intersection of the side, front and rear surfaces with one another and with the respective top surface portions may be slightly rounded.

Frequently when a cat lays down on the pad, it paws will be on surfaces portions 17 and/or 18 while the lower parts of its legs (fibula) may be on the surface portion 18 whereby the front part of the cat is supported at a higher elevation than the rear part of the cat. The foam is of a density that cat's body in being on the pad slightly depresses pad from its shape from what it is when no cat is on the pad. With the pad being used, it keeps more of the hair being shedded by a cat in one place, particularly if the fabric cover is made of a material such as fleece.

The fabric may be made of, for example: cotton, nylon or other type of plastic and advantageously may be shrunken fleece. The bottom layer of fabric may be provided with a zipper extending longitudinally from adjacent to surface 14 to adjacent to surface 15 and close to one of the side surfaces to permit removing the foam part of the pad from the fabric cover. Providing a zipper facilitates removing the fabric cover from the foam whereby the cover may be washed, including for removing shedded cat hair from the cover.

As an example, the plastic foam may be a soft polyurethane foam with a cell construction of 100 percent open foam and a density of 25 KG/m3. Another example of the foam may be a memory foam of a cell construction of 50 percent open cell and a density of 50 KG/m3·s Advantageously the maximum thickness W of the head portion is about twice or somewhat greater than the thickness T main body portion while the maximum longitudinal (length) dimension X of the head portion is about 30 to 40 percent of the total longitudinal dimension L of the pad. The longitudinal length (not inclined dimension) of each of the surface portions 17, 19 is less than that of surface portion 18.

As one example of the invention, but not otherwise a limitation thereon, the height T of the main body M may be 1 inch, the maximum height W of the head portion may be 2 inches, the maximum longitudinal length L of the head portion may be 5.5 inches with the minor base of the trapezoidal portion may be 3.5 inches, the total longitudinal length X of the pad may be 15.5 inches and the transverse dimension may be 9.5 inches. Thus, the longitudinal length of the head portion may be about 30 to 40 percent of the total longitudinal length of the pad. Further, the longitudinal dimensions of the surface portions 17, 19 (not the inclined dimensions) may be the same, for example 1 inch, while the longitudinal dimension of the top surface 18 is greater than the combined longitudinal dimensions of surface portions 17, 19. The dimensions of the foam block may be very near the same as those of the pad since the thickness of the fabric may be a small fraction of an inch.

What is claimed is:

1. A longitudinal elongated pet pad comprising a foam block having generally parallel side surfaces, a vertical rear surface intersecting with the side surfaces, a vertical front surface intersecting with the side surfaces and a top surface having a generally planar first surface intersecting the side surfaces and the front surface that extends upward and rearwardly at an angle of about 45 degrees, a generally planar second surface intersecting with the side surfaces and the first surface, a generally planar third surface intersecting with the side surfaces and the second surface, a generally planar fourth surface intersecting with the side surfaces, the rear surface and the third surface with the third surface extending upwardly and forwardly at an angle of about 135 degrees relative to the fourth surface and a bottom surface intersecting with the front side and rear surfaces, and a fabric cover surrounding the foam block, wherein each of the front and rear surfaces and each of the first, second, third and fourth surfaces are of a rectangular shape, the longitudinal length of the second surface is about three and half inches, and the spacing of the second surface from the bottom surface is about an inch greater than the spacing of the fourth surface from the bottom surface.

2. The pet pad of claim 1 wherein it is of a longitudinal length of about 15.5 inches and a transverse dimention of about 9.5 inches and the longitudinal length of the top surface from the front surface to the intersection of the third surface with the fourth surface is about 30 to 40 percent of the total longitudinal length of the pad.

3. The pet pad of claim 1 wherein the second surface is of a longitudinal dimension that is greater than the combined longitudinal dimensions of the first and third surfaces.

4. The pet pad of claim 3 wherein the longitudinal length of the combination of first, second and third surfaces is about 30 to 40 percent of the total longitudinal length of the pad.

5. For a cat to lay on, a longitudinally elongated pad having a longitudinally elongated, generally planar bottom surface with a front end and a rear end, a front surface extending upwardly from bottom surface front end, a rear surface extending vertically upwardly from the bottom surface rear end, transversely spaced side surfaces extending upwardly from bottom surface and between the front and rear surfaces, and a top surface extending longitudinally between the front surface and the rear surface and transversely between the side surfaces, the top surface includes a generally planar first portion extending upwardly and rearwardly of the front surface and extending between and intersecting with the first surface, a generall planar second portion that is generally parallel to the bottom surface and extends between and intersects with side surfaces, and extending rearwardly of the first portion, a generally planar third portion extending downwardly and rearwardly from the second surface that extends between and intersects with the side surfaces and a fourth portion extending rearward from the third portion to the rear surface and is generally planar to the bottom surface, the longitudinal length of each of the first and third portions being less than half the longitudinal length of the second portion and includes a foam block encased in a fabric to have the above mentioned surfaces, wherein the vertical spacing of the top surface second portion from the bottom surface is about twice that of the vertical spacing of the fourth portion from the bottom surface, the first portion extends upwardly and rearwardly at an angle of about 45 degrees and the second portion is of a longitudinal length of about 3.5 inches and the vertical spacing of the second portion from the bottom surface is about one inch greater than the vertical spacing of the second portion from the bottom surface.

6. The pad of claim 5 wherein each of said portions, the front surface and the rear surface are generally rectangular and planar.

* * * * *